US011216364B2

(12) United States Patent
Guda et al.

(10) Patent No.: US 11,216,364 B2
(45) Date of Patent: Jan. 4, 2022

(54) SEQUENTIAL READ OPTIMIZATION IN A MEMORY SUB-SYSTEM THAT PROGRAMS SEQUENTIALLY

(71) Applicant: Micron Technology, Inc., Boise, ID (US)

(72) Inventors: Chandra M. Guda, Fremont, CA (US); Johnny A. Lam, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 18 days.

(21) Appl. No.: 16/794,016

(22) Filed: Feb. 18, 2020

(65) Prior Publication Data

US 2021/0255949 A1 Aug. 19, 2021

(51) Int. Cl.
*G06F 12/02* (2006.01)
*G06F 12/0864* (2016.01)
*G06F 12/0815* (2016.01)
*G06F 12/0846* (2016.01)
*G06F 13/16* (2006.01)
*G06F 9/54* (2006.01)
*G06F 12/0882* (2016.01)

(52) U.S. Cl.
CPC .......... *G06F 12/0246* (2013.01); *G06F 9/546* (2013.01); *G06F 12/0815* (2013.01); *G06F 12/0846* (2013.01); *G06F 12/0864* (2013.01); *G06F 12/0882* (2013.01); *G06F 13/1673* (2013.01); *G06F 2212/7201* (2013.01)

(58) Field of Classification Search
None
See application file for complete search history.

(56) References Cited

U.S. PATENT DOCUMENTS 6,353,874 B1  3/2002  Morein
2005/0021879 A1*  1/2005  Douglas ................ G06F 13/102
  710/5
2007/0174582 A1  7/2007  Feldman
(Continued)

OTHER PUBLICATIONS

Shadley, Scott, "NAND Flash Media Management through RAIN," Micron Technology, Inc., Technical Marketing Brief, 7 pages, copyright 2011.
(Continued)

*Primary Examiner* — Yaima Rigol
(74) *Attorney, Agent, or Firm* — Lowenstein Sandler LLP

(57) ABSTRACT

A system includes a volatile memory having buffers and a processing device. A command generation processor receives, from a host, a read request with a logical block address (LBA) and creates a first logical transfer unit (LTU), including the first LBA, that is to be mapped to a physical address. The command generation processor reads a flag to determine that the first LTU is associated with a zone of LBA address space, the zone including sequential LBAs that are sequentially mapped to sequential physical addresses. The command generation processor generates command tags that are to direct the processing device to retrieve the data from the memory device and store the data in a set of the buffers, where the command tags include a first command tag associated with the physical address and a second command tag associated with a second physical address that sequentially follows the physical address.

20 Claims, 7 Drawing Sheets

(56) References Cited

U.S. PATENT DOCUMENTS

| | | | |
|---|---|---|---|
| 2009/0019218 A1* | 1/2009 | Sinclair | G11C 11/5621 |
| | | | 711/103 |
| 2009/0125681 A1* | 5/2009 | Makita | G11B 27/002 |
| | | | 711/114 |
| 2011/0072193 A1 | 3/2011 | Yeh | |
| 2012/0072641 A1 | 3/2012 | Suzuki et al. | |
| 2015/0074328 A1 | 3/2015 | Baryudin et al. | |
| 2015/0347040 A1* | 12/2015 | Mathur | G06F 3/0679 |
| | | | 711/103 |
| 2016/0283116 A1* | 9/2016 | Ramalingam | G06F 3/0611 |
| 2016/0342509 A1* | 11/2016 | Kotte | G06F 12/0246 |
| 2018/0357170 A1* | 12/2018 | Benisty | G06F 12/0868 |
| 2019/0035473 A1* | 1/2019 | Rajamani | G06F 3/061 |

OTHER PUBLICATIONS

PCT Notification of Transmittal of the International Search Report and the Written Opinion of the International Searching Authority for PCT Application No. PCT/US2021/018429, dated Jun. 3, 2021, 9 pages.

\* cited by examiner

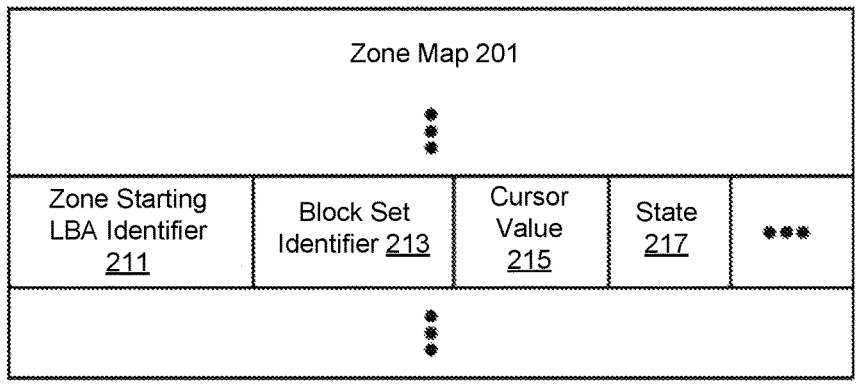
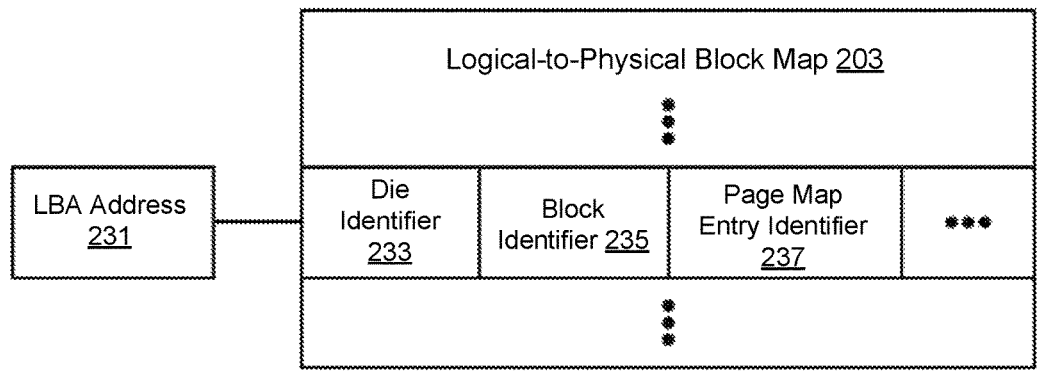
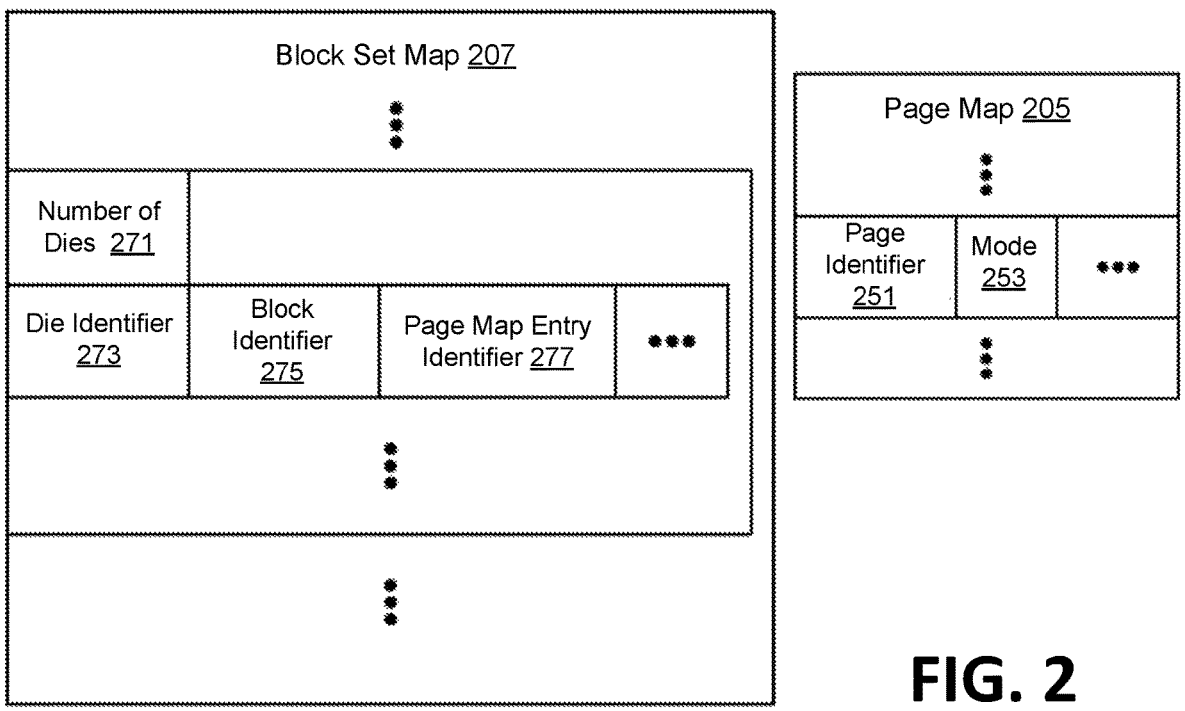
FIG. 2

500

```
Receive a read operation having a first logical block address (LBA) of an
LBA address space for a memory device. 510
                            ↓
Create a first logical transfer unit (LTU) to include the first LBA, the first
LTU to be mapped to a first physical address of a memory device. 520
                            ↓
Read a flag to determine that the first LTU is associated with a zone of
the LBA address space, the zone including sequential LBAs that are
sequentially mapped to sequential physical addresses. 530
                            ↓
Allocate a set of buffers in memory, where a capacity of the set of buffers
matches an amount of data stored at the first physical address and at
subsequent physical addresses that are sequentially numbered within a
read window size that starts at the first physical address.
540
                            ↓
Generate set of command tags that are to direct a command execution
processor to retrieve the data from the memory device and store the data
in the set of buffers, the command tags including at least a first command
tag associated with the first physical address and a second command tag
associated with a second physical address that sequentially follows the
first physical address. 550
```

FIG. 5

SEQUENTIAL READ OPTIMIZATION IN A MEMORY SUB-SYSTEM THAT PROGRAMS SEQUENTIALLY

TECHNICAL FIELD

Embodiments of the disclosure relate generally to memory sub-systems, and more specifically, sequential read optimization in a memory sub-system that programs sequentially.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is a block diagram that illustrates an example of data structures configured to support zone-based mapping according to various embodiments.

FIG. 5 is a flow chart of a method for sequential read optimization according to a related embodiment.

DETAILED DESCRIPTION

Figure 1A:
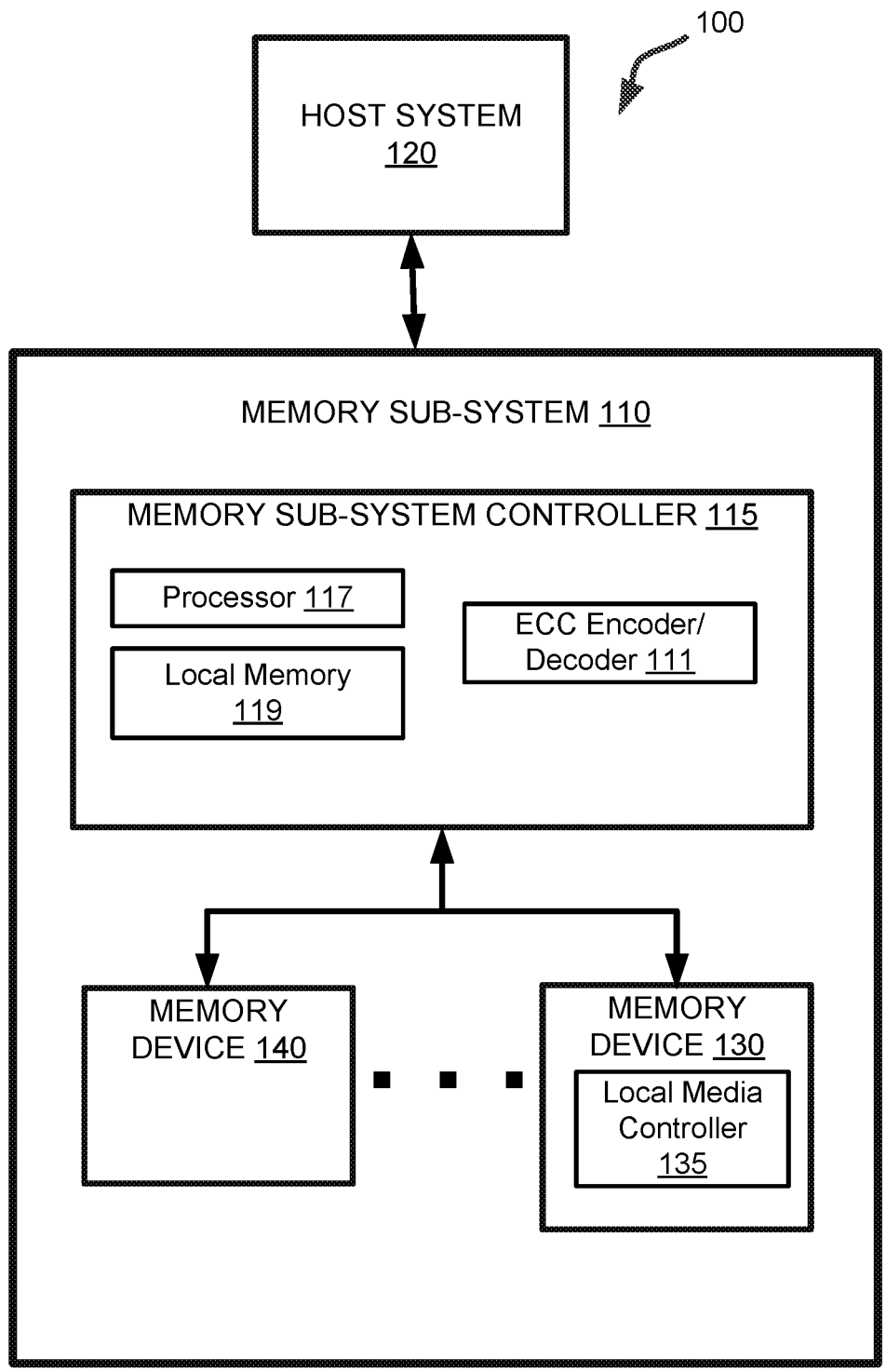
FIG. 1A illustrates an example computing system that includes a memory sub-system according to embodiments.

Aspects of the present disclosure are directed to sequential read optimization in a memory sub-system that programs sequentially. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1A. A non-volatile memory device is a package of one or more dice. The dice in the packages can be assigned to one or more channels for communicating with a memory sub-system controller. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system.

The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), and the like. For simplicity, where "data" is referred to hereafter, such data can be understood to refer to at least host data, but can also refer to other data such as media management data and/or system data.

The cells (or simply "media") of memory devices can be organized hierarchically from die (upper level), to plane, to block, to page (lower level). A block set (also referred to as a block stripe) can be a set of blocks arrayed across planes of different dies, such that the blocks are grouped together for purposes of data storage. Writing to block stripes allows more host data that can be concurrently written and read at the same time across multiple dies. Multiple blocks of one or more block set can be identified as a data group.

In various embodiments, a host file system can group host data by locality and write the host data sequentially to memory sub-systems. File systems can then write host data of different localities as parallel sequential streams to memory sub-systems, each stream having its own locality, e.g., where different host applications can each write to its own stream. "Locality" can refer to either temporal locality or spatial locality. Data grouped with temporal locality is host data that a processor tends to access at the same memory device locations repetitively over a short period of time, e.g., data written, over-written, and trimmed around the same time. Being trimmed makes reference to use of an operating system of a trim command to inform the memory device of blocks of data that are no longer in use and can be wiped internally, e.g., via garbage collection. Data grouped with spatial locality captures the data retrieval patterns of when a particular storage location is referenced at a particular time, then it is likely that nearby memory locations (on the memory device) will be referenced in the near future. In this case, a processor can attempt to determine the size and shape of the area around the currently referenced memory location for which it is worthwhile to prepare for faster access for subsequently referenced locations. Reference to sequential locality is a special case of spatial locality that occurs when data elements are arranged and accessed linearly, such as in traversing the elements in a one-dimensional array.

Memory sub-system controllers (e.g., that include a processing device) usually write to media randomly in portions of host data (e.g., 4 KB), and then use metadata to map LBA space to the physical address space of the media. When a larger group of host data (e.g., 100 MB or more) is written grouped with data locality, however, the "data group" can be sequentially written as a larger chunk to one or more block sets across multiple dies. In order to simplify mapping of such data groups, LBAs of a zone (e.g., logical address space associated with a data group) may be sequentially ordered within the LBA space and be mapped to sequentially ordered physical addresses within the physical address space. In other words, the data group can be associated with LBA space zone having multiple sequential LBAs that are sequentially mapped to multiple sequential physical addresses. Memory sub-systems that can write (e.g., program) zones of data at a time and map the zones accordingly operate in zone namespace (ZNS), e.g., where a zone of logical addresses are named/identified as a group. Advantageously, use of ZNS for logical-to-physical (LTP) address mapping greatly reduces the amount of metadata to track the LTP mapping.

In memory sub-systems, read requests (or read operations) are usually issued one command tag at a time to a translation processor (e.g., that translates a logic address to a physical address) of the memory sub-system controller, resulting in random reads at a granularity specified by the command tag. A command tag, also referred to as a system tag (e.g., systag), includes a logical transfer unit (LTU) number and a buffer address identifying a buffer (e.g., a slot or entry in volatile memory) in which the contents corresponding to the transfer unit are stored as if in a cache. The LTU, which in one embodiment corresponds to a 4 KB portion of data, is a subset of the multiple sequential LBAs that can be mapped to a physical address via a set of mapping data structures. Accordingly, to create an LTU, a command generation processor of the memory sub-system controller can combine an LBA of a read request with additional LBAs (which can also be received in read requests) that are sequential to the LBA. Each LTU can be translated to a logical block or a logical page depending on LTU type.

Because read requests are conventionally performed one command tag at time, each read request generates a command message (e.g., a mailbox message in one example) into the command generation processor of the memory sub-system controller (regardless if the read is sequential) and generates multiple (e.g., four) data structure lookups for mapping the LBA of the read request to a physical location in the memory device, as will be explained in detail. A command message can be used post fetching of a non-volatile memory command, where the command generation processor notifies the translation processor about receipt of the command. These data structures (e.g., tables) can be stored in tightly coupled memory (TCM) or static read only memory (SRAM), or other volatile memory. This manner of handling read requests increases overhead and lowers overall performance by increasing latency, especially given that some read requests are issued sequentially to sequentially written physical address spaces (e.g., of ZNS). Accordingly, the sequential data layout from sequential writes is not leveraged to limit the number of lookups that the memory sub-system controller (e.g., the translation processor of the memory sub-system controller) has to perform to determine the physical address from which to retrieve the data to fulfill a read request.

Aspects of the present disclosure address the above and other deficiencies by employing a shared volatile memory (e.g., at least one volatile memory device) through which a translation processor of the processing device can communicate, to a command execution processor of the processing device, a first physical address (to which is mapped a first LTU specified by a first command tag) and set a flag (e.g., a bit flag) indicating that the first physical address is part of sequentially written data. The command generation processor of the processing device can then access, in the volatile memory, the physical address and the flag to determine how to generate a set of command tags, to include the first command tag, which are to be issued as a group. The command generation processor can further send a set of commands, which include the command tags, directly to the command execution processor of the processing device while bypassing any further lookups, by the translation processor, in the mapping data structures. The command execution processor can read the data from the physical addresses specified by the command tags into a set of buffers (e.g., slots within the volatile memory) allocated for this purpose.

In various embodiments, more specifically, this set of command tags can include not only a first command tag associated with the physical address, but also additional command tags associated with subsequent physical addresses that are sequentially numbered within a read window size (e.g., offset value) that starts at the first physical address. In this way, the sequential data is read in lookahead fashion and stored in the set of buffers allocated to handle the capacity of data stored at the first physical address and the subsequent physical addresses, e.g., a read lookahead of the offset value. The data requested by the host system read from the physical address is returned to the host system. In the event the host system requests data from a second or subsequent physical address within the offset value of the physical address, the command generation processor can quickly retrieve the data from the set of buffers and send the data to the host system without any further lookups or translations.

Advantages of the present disclosure include but are not limited to improved read performance and avoiding the heavy cost of interrupting write operations in order to service so many read requests (which occur more frequently than write operations), e.g., by allowing many read requests to hit in the buffers with read lookahead operations. Further, the present disclosure explains ways of performing sequential read performance optimization in order to lower latency on sequential read requests from the host system (even if those read requests are interspersed with write operations and/or read requests to other zones). These advantages synergistically leverage sequential writes performed by ZNS-enabled memory devices. Other advantages will be apparent to those skilled in the art of memory allocation and error optimization within a memory sub-system discussed hereinafter.

FIG. 1A illustrates an example computing system 100 that includes a memory sub-system 110 in accordance with some embodiments of the present disclosure. The memory sub-system 110 can include media, such volatile memory (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAIVI), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

Figure 1B:
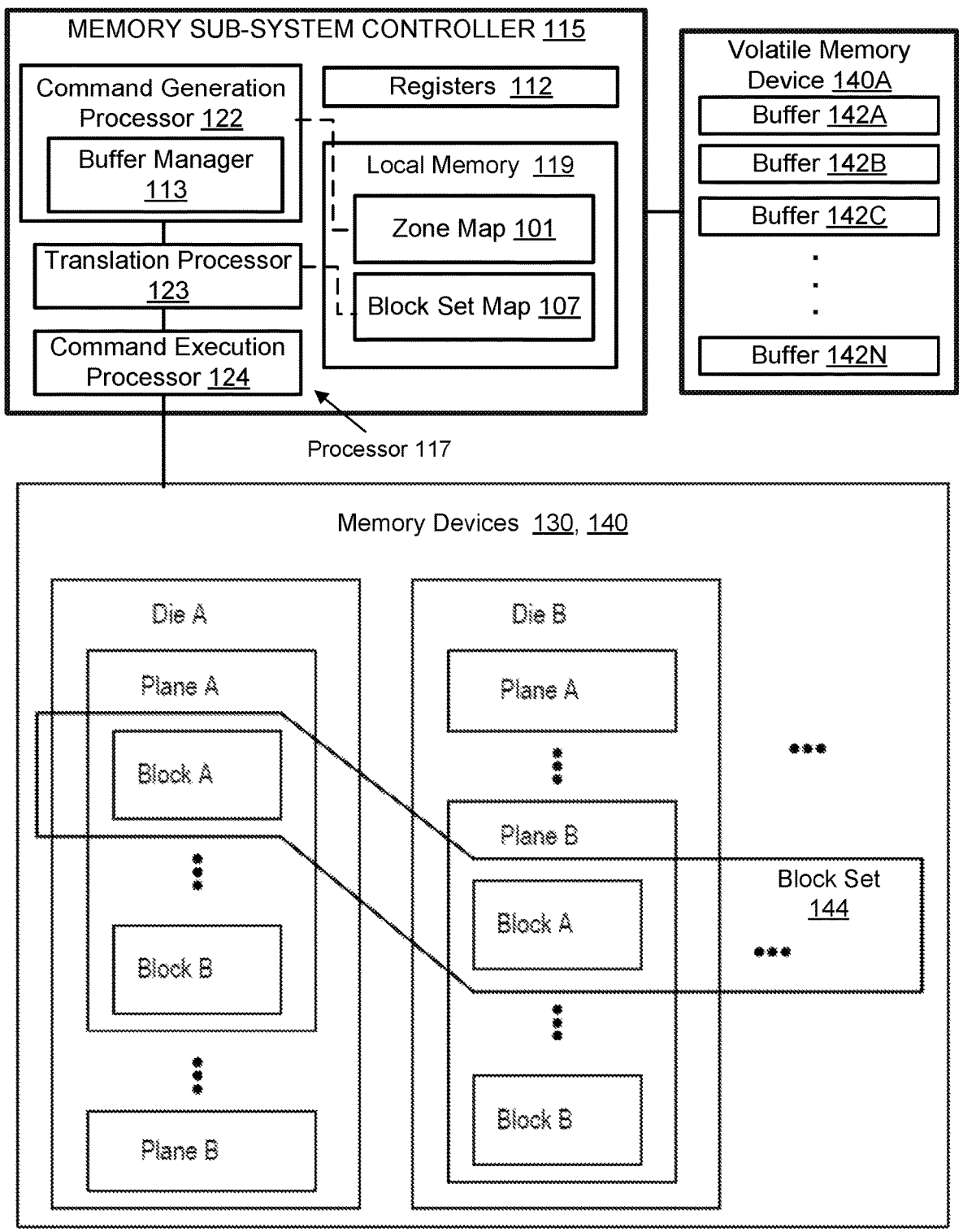
FIG. 1B illustrates the memory sub-system of FIG. 1A in additional detail according to an embodiment.

FIG. 1B illustrates the memory sub-system 110 of FIG. 1A in additional detail according to an embodiment. In the embodiment, the memory sub-system controller 115 (e.g., processing device, referred to as controller 115 for simplicity) includes one or more registers 112, a command generation processor 122, which includes a buffer manager 113, a translation processor 123, a command execution processor 124, and the local memory 119. For example, the processor 117 (FIG. 1A) can include the command generation processor 123, the translation processor 123, and the command execution processor 124. The local memory 119 can store a zone map data structure 101 and a block set map data structure 107 among other ZNS mapping data structures, e.g., as illustrated in FIG. 2. In one embodiment, the zone map data structure 101 includes multiple entries, such that each entry has a block set entry identifier that links to an entry within the block set map data structure 107, which in turn can link to an entry of a page map data structure, which locates a page in memory, as will be explained in detail with reference to FIG. 2.

Further, as previously discussed with reference to one or more memory device(s) 130, 140, the physical address space of the multiple dies (e.g., Die A and Die B) can be hierarchically organized by plane, block, and page. So, for example, each of Die A and Die B can include Plane A and Plane B, and each of Plane A and Plane B can include Block A and Block B. A block set (or block stripe) can be defined as a group of blocks arrayed across planes of multiple dies of the memory device(s). As illustrated, a block set 144 is arrayed to include Block A of Plane A of Die A, Block A of Plane B of Die B, and so forth, e.g., also of Plane C of Die C and on to further dies, if present and online.

In various embodiments, the translation processor 123 (and/or a dynamic data placer of the controller 115 coupled to the translation processor 123) dynamically determines a media layout to place data associated with logical addresses in the media units or memory components (also referred to as "IC dies" or "media") of the memory devices 130, 140. A media layout specifies the mapping between the logical addresses used in commands received in the memory sub-system 110 (e.g., from the host system 120) and the physical memory locations in the media of the memory sub-system 110.

The translation processor 123 can determine the media layout for a portion of logical addresses of LBA space for the placement of data at the logical addresses associated with physical addresses of media of the memory device 130 or 140, e.g., based on the availability of the media to write, program, store, commit data at the time of input/output scheduling in the memory sub-system 110. When IC die(s), including media units within the IC die(s), are available for committing/programming data, a write command is scheduled for execution in the memory sub-system 110; and the translation processor 123 generates a portion of the media layout for the write command and maps the logical address(es) used in the write command to map to memory locations within the IC die(s). The execution of the write command causes the memory sub-system 110 to commit/program data associated with the write command into the IC die(s).

Depending on availability of IC dies across the media and/or application of a sequential mapping scheme, the controller 115 can either sequentially write data groups (e.g., provided in a sequential stream of data locality) to fill up one IC die at a time or can sequentially write to multiple IC dies at a time, in parallel, e.g., to concurrently fill up the IC dies of the media. The mapping of the writes within the zones of the LBA space can also be done sequentially to simplify the calculations used to perform the mapping, as will be discussed in more detail with reference to ZNS mapping data structures. When there are multiple IC dies available, logical addresses (e.g., LBAs) used in the commands from multiple write streams can be mapped by the dynamically generated portion of the media layout to the multiple IC dies respectively, such that there is no media access collision in the execution of the commands from the multiple write streams.

In various embodiments, the translation processor 123 accesses certain ZNS mapping data structures (e.g., the zone map data structure 101 and the block set map data structure 107) in order to translate LBAs to physical block addresses (PBAs) of physical address space. The translation processor 123 in the context of flash media (e.g., NOR or NAND flash memory) can be referred to as flash translation layer (FTL). The mapping employed by the translation processor 123 can generally be assumed to involve a type of block mapping, e.g., block-level mapping or log-block mapping. Where data locality is detected or in a ZNS memory device, the translation processor 123 can map a group of blocks forming a zone, e.g., within the ZNS data structures, which can involve mapping sequentially numbered LBAs to sequentially numbered PAs, as previously discussed. The use of the ZNS data structures, and their interrelation, for mapping LBA space of a zone to physical address space of the media is discussed in more detail with reference to FIG. 2.

In some embodiments, the memory sub-system 110 also includes a volatile memory device 140A (e.g., a shared volatile memory such as TCM, SRAM, DRAM or a combination thereof) in which are allocated buffers used to store (e.g., cache) data in fulfillment of read requests. Each buffer, for example, may be an addressed slot or entry of the volatile memory device 140A. The buffers can include a first buffer 142A, a second buffer 142B, a third buffer 142C, and so forth up through an Nth buffer 142N. Each buffer can store a page size of data. In an alternative embodiment, although showed separately, the volatile memory device 140A is actually part of the local memory 119 of the controller 115.

In various embodiments, the command generation processor 122 performs command processing, e.g., generating read commands and write commands based on read and write requests, respectively received from the host system 120 or another requesting agent. As part of executing read requests, the buffer manager 113 of the command generation processor 122 can allocate a certain number (e.g., "a set") of the buffers having a capacity that matches an amount of the data stored at the first physical address (mapped to by the LTU created to include the LBA of the read request) and at subsequent physical addresses that are sequentially numbered following the first physical address, e.g., within an offset value that defines a read window size of the memory device. In one embodiment, the offset value is 128 KB, allowing for read lookahead of an additional 124 KB of data beyond the first read request. Various other offset values or read window sizes are envisioned. For example, each subsequent physical address can be incremented by page number across a read window of sequential physical address space defined by the offset value, to determine the subsequent physical addresses. Allocation and tracking of the buffers, by the buffer manager 113, facilitates read lookahead operation.

In these embodiments, the command generation processor 122 can further generate a set of command tags that are utilized to direct the command execution processor 124 of the processing device to retrieve the data from the first address and the subsequent addresses of the memory device 130 or 140, and store the data in the set of buffers. The command generation processor can 122 can further transmit, to the command execution processor 124, a group of commands including the set of command tags. In this way, each command tag of the set of command tags includes an LTU number identifying an LTU that is mapped to a physical address of one of the respective sequential physical addresses.

In related embodiments, the buffer manager 113 can track usage of the buffers and be responsible for locking or freeing of the buffers when host commands hit on these buffers using any number of buffer management algorithms to track the data cached in various buffers by a number of possible applications. The buffer management algorithms can include, for example, a two-three tree algorithm (also referred to as 2-3 tree algorithm) in which the buffers are sorted by LTU number (or LBA number), a linked list algorithm, or an N-way cache that employs a hash algorithm. For example, the buffer manager 113 can employ a buffer index table in which sequentially read data cached in the buffers is indexed against discontinuous buffer numbers, as illustrated in Table 1.

TABLE 1

| Data Index (e.g., for 64 byte data) | Buffer Index |
| --- | --- |
| 0 | 0 |
| 1 | 3 |
| 2 | 4 |
| ... | ... |
| ... | ... |
| 63 | 230 |

Metadata that can be used by such buffer management algorithms (e.g., for tracking buffer allocation and usage) includes an LTU/LBA (on which the data is sorted), a buffer address (or other buffer identifier used for indexing) that indicates at which buffer slot the data resides, and a buffer usage count that allows for multiple users (e.g., host applications) in separate read or write paths to be jointly tracked. In this way, the buffer manager 113 can manage multiple applications writing to and reading from multiple zones where any set of commands can be either writing to or reading from sequentially stored data, although allocated buffers may not be numbered sequentially, as illustrated in Table 1. If the data in the buffers is tracked, hardware acceleration can be used to facilitate the tracking and management of the data in the buffers.

The buffer manager 113 can further use a flag (e.g., bit flag) or a counter to track whether or not any given buffer is being used in the read or write path. This can allow for a quick search time for a buffer to satisfy an inflight command (e.g., that is already being processed) and short search times to find a particular LBA, and thus whether the buffer can be used for a cache hit and direct transfer to the host system 120, instead of having to go back to the translation processor 123 for mapping. Coherency, due to retrieving data from the buffers, which perform like cache, should not be an issue as long as the zone map data structure 101 is checked first, which is the command generation processor 122 will continue to do within the disclosed sequential read optimization. In some embodiments, the controller 115 includes at least a portion of the buffer manager 113. In other embodiments, or in combination, a controller and/or a processing device of the host system 120 includes at least a portion of the buffer manager 113. For example, the controller 115, or the processing device of the host system 120, can be configured to execute instructions stored in memory for performing the operations of the buffer manager 113 described herein. In some embodiments, the buffer manager 113 is implemented in an integrated circuit chip disposed in the memory subsystem 110. In other embodiments, the buffer manager 113 is part of an operating system of the host system 120, a device driver, or an application.

In these embodiments, the command execution processor 124 sequences write and read commands within a channel of a data bus to the memory device(s) 130, 140. The command execution processor 124 can further, in response to receipt of the read commands, retrieve the data from the first physical address and from the subsequent physical addresses of the memory device(s) 130, 140 to which the set of command tags point. Recall that each command tag includes an LTU, which maps to a physical address, and identifies a buffer address within the buffers cached in the volatile memory device 140A. The command execution processor 124 can further store (e.g., cache) the data fulfilling the read commands into the allocated buffers according to respective buffer addresses of the set of command tags, which were generated by the command generation processor 122 and included within the group of commands sent to the command execution processor 124. The command execution processor 124 can further perform error handling in the physical layer, e.g., corresponding to the physical address space.

The translation processor 123 translates LTUs to physical addresses of the physical address space to facilitate generation of commands by the command generation processor 122 to the command execution processor 124. Accordingly, the translation processor 123 can act as an intermediary between the command generation processor 124 (which receives a memory request with an LBA and creates an LTU to include the LBA) and the command execution processor 124 that needs to know the physical address of the physical layer to fulfill a command. In the present disclosure, regular use of the translation processor 123 for indexing into various ZNS mapping data structures can be avoided in read lookahead operations of sequential read optimization.

FIG. 2 is a block diagram that illustrates an example of data structures configured to support zone-based mapping according to various embodiments. The controller 115 can store the data structures illustrated in FIG. 2 in the local memory 119, e.g., in SRAM, or in memory components of the memory device 140, e.g., in DRAM. The controller 115 can also configure or implement the media layout (e.g., a layout of where a data group of a zone is to be located within physical address space) using the data structures of FIG. 2. In FIG. 2, a zone map data structure 201 is configured to provide media layout information for a zone in a namespace, e.g., the LBA space for ZNS operation. The zone map data structures 201 may be the same or similar to the zone map data structure 101 of FIG. 1B. The zone map data structure 201 can have multiple entries. Each zone map entry in the zone map data structure 201 identifies information about a zone, such as a starting LBA address 211 of the zone, a block set identifier 213 of the zone, a zone cursor value 215 of the zone, a state 217 of the zone, and the like.

The host system 120 writes data in the zone beginning at the LBA of the zone starting LBA identifier 211. The host system 120 writes data in the zone sequentially in the LBA space. After an amount of data has been written into the zone, the current starting LBA address for writing subsequent data is identified by the zone cursor value 215. Each write command for the zone moves the zone cursor value 215 to a new starting LBA address for the next write command for the zone. The state 217 can have a value indicating that the zone is empty, full, implicitly open, explicitly open, closed, and the like, to track progress of writing that zone.

In FIG. 2, a logical-to-physical block map data structure 203 is configured to facilitate the translation of LBA addresses into physical addresses in the media. The logical-to-physical block map 203 can have multiple entries. An LBA can be used as, or converted into, an index (e.g., an LTU number) for an entry in the logical-to-physical block map 203. The index can be used to look up an entry for the LBA. Each entry in the logical-to-physical block map 203 identifies, for an LBA, the physical address of a block of memory in the media. For example, the physical address of the block of memory in the media can include a die identifier 233, a block identifier 235, a page map entry identifier 237, and the like. A die identifier 233 identifies a specific IC die (e.g., Die A or Die B) of the memory device(s) 130, 140 of the memory sub-system 110. A block identifier 235 identifies a specific block of memory (e.g., NAND flash memory) within the IC die that is identified using the die identifier 233. A page map entry identifier 237 identifies an entry in the page map data structure 205.

The page map data structure 205 can have multiple entries. Each entry in the page map 205 can include a page identifier 251 that identifies a page of memory cells within a block of memory cells (e.g., NAND memory cells). For example, the page identifier 251 can include a word line number for the page and a sub block number for the page in the block of NAND memory cells. Further, the entry for the page can include a programming mode 253 of the page. For example, the page can be programmed in an SLC mode, an MLC mode, a TLC mode, or a QLC mode. When configured in the SLC mode, each memory cell in the page is to store one bit of data. When configured in the MLC mode, each memory cell in the page is to store two bits of data. When configured in the TLC mode, each memory cell in the page is to store three bits of data. When configured in the QLC mode, each memory cell in the page is to store four bits of data. Different pages in an integrated circuit die can have different modes for data programming.

In FIG. 2, the block set data structure 207 stores data controlling aspects of the dynamic media layout for a zone. The block set data structure 207 may be the same or similar to the block set map data structure 107 of FIG. 1B. The block set data structure 207, which can be a table in one embodiment, can have multiple entries. Each block set entry in the block set data structure 207 identifies a number/count 271 of integrated circuit dies (e.g., Die A and Die B) in which data of the zone is stored. For each of the integrated circuit dies used for the zone, the block set entry of the block set data structure 207 has a die identifier 273, a block identifier 275, a page map entry identifier 277, a page map offset value, and the like.

The die identifier 273 identifies a specific IC die (e.g., Die A or Die B) in the media of the memory sub-system 110, on which IC die subsequent data of the zone can be stored. The block identifier 275 identifies a specific block of memory (e.g., NAND flash memory or other media) within the IC die that is identified using the die identifier 273, in which block the subsequent data of the zone can be stored. The page map entry identifier 237 identifies a page map entry in the page map data structure 205, which identifies a page that can be used to store the subsequent data of the zone.

For example, a memory sub-system 110 receives multiple streams of write commands. In an embodiment, each respective stream in the multiple streams is configured to write data sequentially in a logical address space in one embodiment;

and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of the write streams is permitted to sequentially write at LBAs in a zone in a namespace allocated in the media of the memory device(s) 130, 140 of the memory sub-system 110, but prohibited from writing data out of sequence in the LBA (or logical address) space. The translation processor 123 of the memory sub-system 110 identifies multiple media units in the memory sub-system 110 that are available to write data concurrently.

The translation processor 123 can select first commands from the multiple streams for concurrent execution in the multiple media units that are available to write data. The translation processor 123 can generate and store, dynamically in response to the first commands being selected for concurrent execution in the multiple media units, a portion of a media layout that maps from logical addresses identified by the first commands in the logical address space to physical addresses of memory units in the multiple memory units.

The command execution processor 124 can execute the first commands concurrently by storing data into the memory units according to the physical addresses. For example, at the time of scheduling the first commands for execution, execution of second commands can be in progress in a subset of memory units of the media of the memory sub-system 110. Thus, the subset of memory units used for the execution of the second commands are not available for the first commands. After the first commands are scheduled and the portion of the media layout for the logical addresses used in the first commands is determined, the first commands can be executed in the multiple media units concurrently and/or concurrently with the progress of the execution of the second commands in remaining media units of the memory sub-system 110.

For example, after the identification of the multiple memory units (e.g., IC dies) that are available for the execution of next commands, the translation processor 123 can identify, from the block set data structure 207, the physical addresses that can be used to store data of the next commands. The physical addresses can be used to update the corresponding entries in the logical to physical block map data structure 203 for the LBA addresses used in the next commands.

For example, when an IC die is free to write data, the translation processor 123 can determine a command of a zone that can be written/programmed into the memory cells in the IC die. From the block set data structure 207, the translation processor 123 locates an entry for the zone, locates the block identifier 275 and the page map entry identifier 277 associated with the identifier 273 of the integrated circuit die, and uses the die identifier 273, the block identifier 275, and the page map entry identifier 277 to update the corresponding fields of the entry in the logical to physical block map data structure 203 for the LBA used in the command of the zone.

Figure 3:
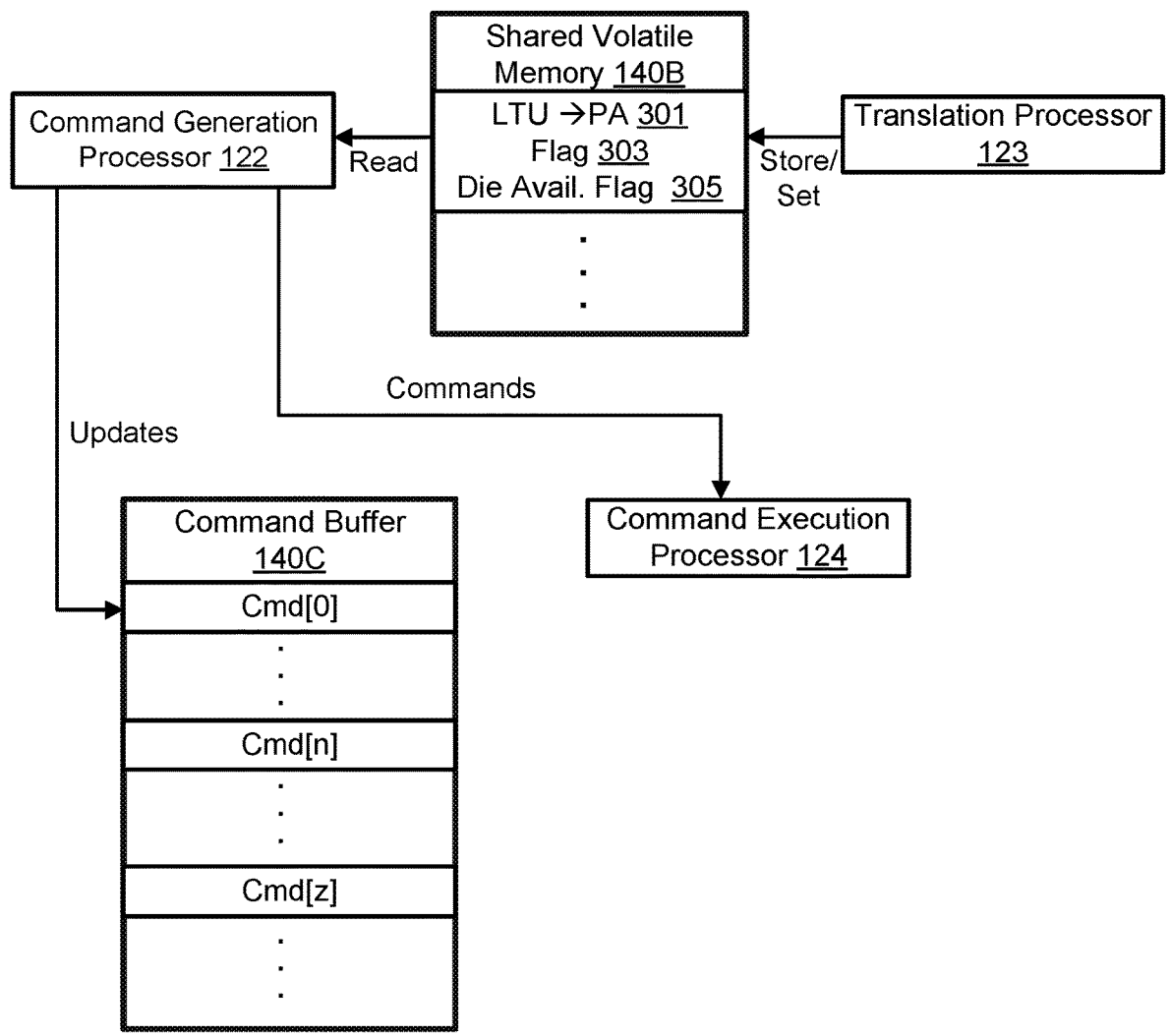
FIG. 3 is a block diagram of interrelationships of a command generation processor, a translation processor, and a command execution processor of a memory sub-system controller of FIGS. 1A-1B according to an embodiment.

FIG. 3 is a block diagram of interrelationships of the command generation processor 122, the translation processor 123, and the command execution processor 124 of the sub-system memory controller 115 of FIGS. 1A-1B according to an embodiment. In various embodiments, the controller 115 includes shared volatile memory 140B and a command buffer 140C in the shared volatile memory 140B. In one embodiment, the shared volatile memory 140B is part of the local memory 119 or the volatile memory device 140A discussed with reference to FIG. 1B. In various embodiments, the command generation processor 122 can receive a first read request from the host system 120 (or other requesting agent). The first read request can include a first LBA, which corresponds to a first physical address of the memory device 130 or 140 to which the read operation is directed. In servicing the first read request, the command generation processor 122 can create a first logical transfer unit (LTU) to include the first LBA, the first LTU to be mapped to the first physical address of a memory device In some embodiments, the translation processor 123 can be configured to automatically store (or buffer) LTU-to-physical address (PA) mappings 301 into the shared volatile memory 140B as their data is programmed into the memory device(s) 130, 140. For example, the LTU-to-PA mapping 301 may be a portion of the logical-to-physical block map data structure 203 and the page map data structure 205, to which were written when the respective physical addresses were programmed to the memory device 130 or 140. This can provide a quickly accessible data structure that provides just LTU-to-PA mapping at the command tag level. In some embodiments, the LTU-to-PA mappings 301 in the shared volatile memory 140B can be treated as cache to keep this data structure limited in size.

With continued reference to FIG. 3, the translation processor 123 can further selectively set a flag 303 (e.g., a bit flag or the like) in the shared volatile memory 140B. Each entry in the LTU-to-PA mappings 301 can therefore include a physical address mapped to an LTU number and a flag. In an alternative embodiment, a bit value of a bit map stored in the registers 112 (FIG. 1B) can be set. One of the bit values of the bit map can correspond to a particular LTU and thus function as the flag 303 of the shared volatile memory 140B. The bit map can be correlated to the physical address space known to be sequentially written, e.g., per ZNS operation. The flag 303 (or bit value within the bit map) can indicate whether that LTU-to-PA mapping entry is associated with a zone of LBA address space, where the zone is mapped to data that is sequentially written in the memory device 130 or 140. The translation processor 123 can further selectively set a die available flag 305 to indicate that the die where the physical address is located is available to service commands.

In various embodiments, if the flag 303 is set and the die available flag 305 are both set, the command generation processor 122 performs the read lookahead optimization disclosed herein. That read optimization can include, for example, auto-incrementing a first physical address retrieved from the LTU-to-PA mapping 301 for a first read request, to determine subsequent physical addresses within an offset value (e.g., a read window size) of the first physical address. In one embodiment, the auto-incrementing is performed to increment the first physical address by page number until reaching an end of the read window size from the first physical address.

The command generation processor 122 can then generate (or update), within the command buffer 140C, a set of command tags that are utilized to direct the command execution processor 124 to retrieve the data from the memory device 130 or 140 and store the data in a set of the buffers, which were discussed with reference to FIG. 1B. The command generation processor 122 can then further transmit, to the command execution processor 124 of the processing device, a group of commands respectively including one of the set of command tags. The set of commands can be buffered within the command buffer 140C as Cmd[0], Cmd[1], Cmd[2], and so forth through Cmd[n]. In one embodiment, the command generation processor 122 can interlink the set of command tags into a command chain (e.g., a chain of respective commands) and transmit the command chain in a single command message to the command execution processor 124.

After the command execution processor 124 has stored the data into the respective buffers allocated for a read lookahead of the first (or original) read command, the command generation processor 122 can return the data stored at first physical address to the host system 120 or other requesting agent. The command generation processor 122 can also, however, further service subsequent read commands directed to the subsequent physical addresses directly out of the buffers. For example, in response to a second read request, the command generation processor 122 can determine that a second LBA of the second read request corresponds to a second physical address, of the subsequent physical addresses. The command generation processor 122 can then retrieve a second subset of the data from a second buffer, of the set of the buffers, having a buffer address associated with a second command tag, of the set of command tags, and transmit the second subset of the data to the host system 120 in response to a first of the subsequent read commands.

As an example of the above sequential read optimization that includes read lookahead operation, assume that each zone is 100 MB, and that the host system 120 attempts to read access sequential read locations. The host system 120 can issue multiple read requests that fall within the example LBAs that map to the zones illustrated in Table 2.

TABLE 2

| LBA Value within: | Zone ID (ZID) |
|---|---|
| 300-399 | 3 |
| 200-299 | 2 |
| 100-199 | 1 |
| 0-99 | 0 |

Assume that each block set (e.g., block stripe) has 200 pages, then these zone IDs can translate, via the zone map data structure 201, to the following block set identifiers and write pointers as illustrated in Table 3. Each block set identifier identifies the block set (or block stripe) in which the data is written and the write pointer tracks the location where the new write data should be written next in a given zone. Data up to the write pointer is readable from the starting location described in Table 2 for each zone.

TABLE 3

| Zone ID (ZID) | Block Set Identifier; Write Pointer |
|---|---|
| 3 | 0xA, 99 |
| 2 | 0xF, 200 |
| 1 | 0x7, 178 |
| 0 | 0x2, 0 |

Accordingly, assuming that a first read request is directed at LBA 200, the command generation processor 122 determines that the zone ID is 2. In response, the command generation processor 122 can perform the read lookahead operation disclosed herein with multiple commands directing the command execution processor 124 to store, in a set of allocated buffers, data associated with LBA values 200-208, e.g., the base LBA value plus the offset of eight, for example. The offset value can be determined as a predetermined amount of data that is sequentially written at one time or some other predetermined number of pages determined to be an amount of data that the buffers can cache. Assume the host system 120 can next issue a second read request with LBA value of 201, which is the next sequential LBA after LBA 200. This second subset of the data for LBA value of 201 is now stored in the buffers, and the command generation processor 122 can return that second subset of the data to the host system 120 in response to the second read request.

Figure 4:
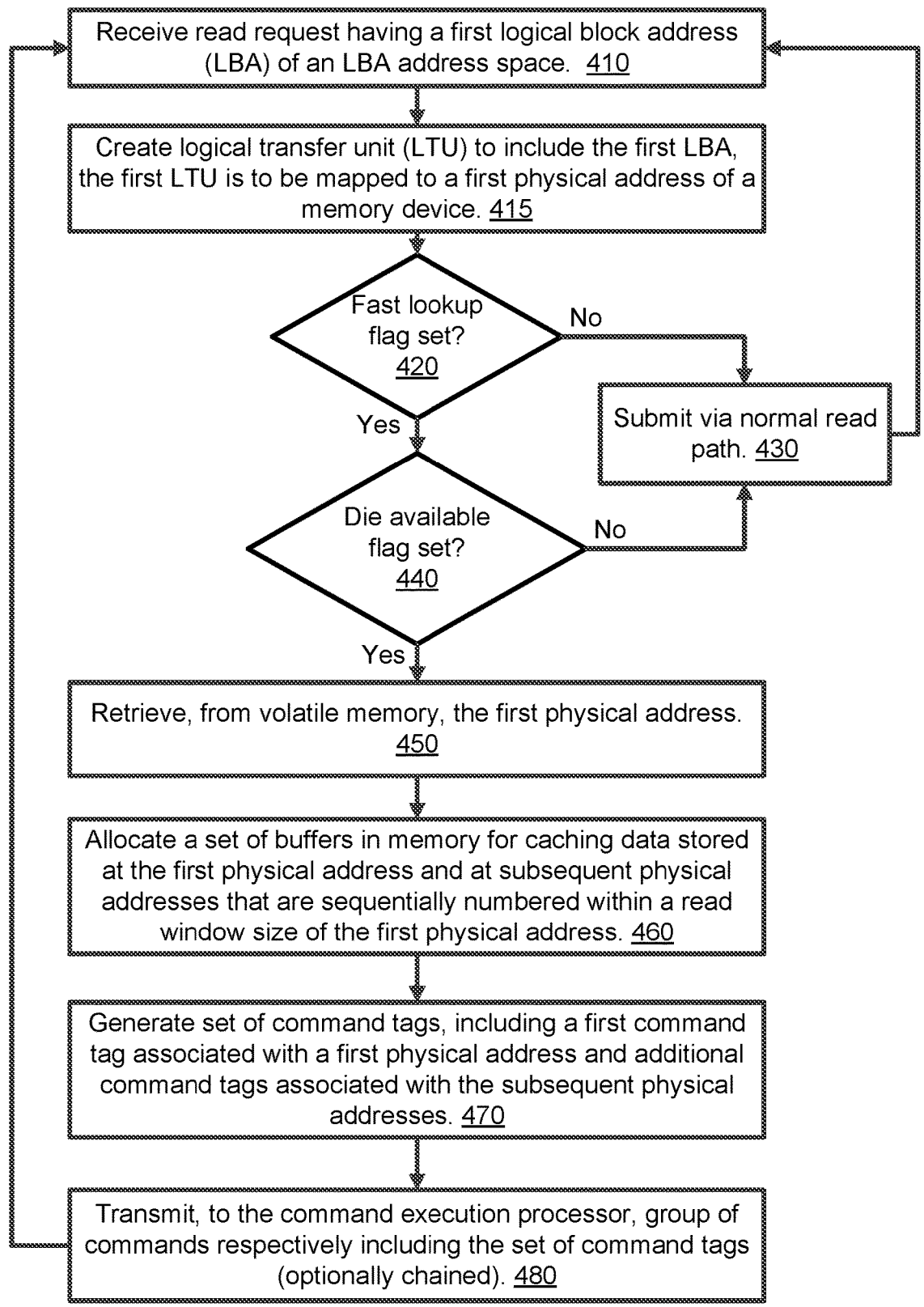
FIG. 4 is a flow chart of a method for sequential read optimization according to an embodiment.
Figure 6:
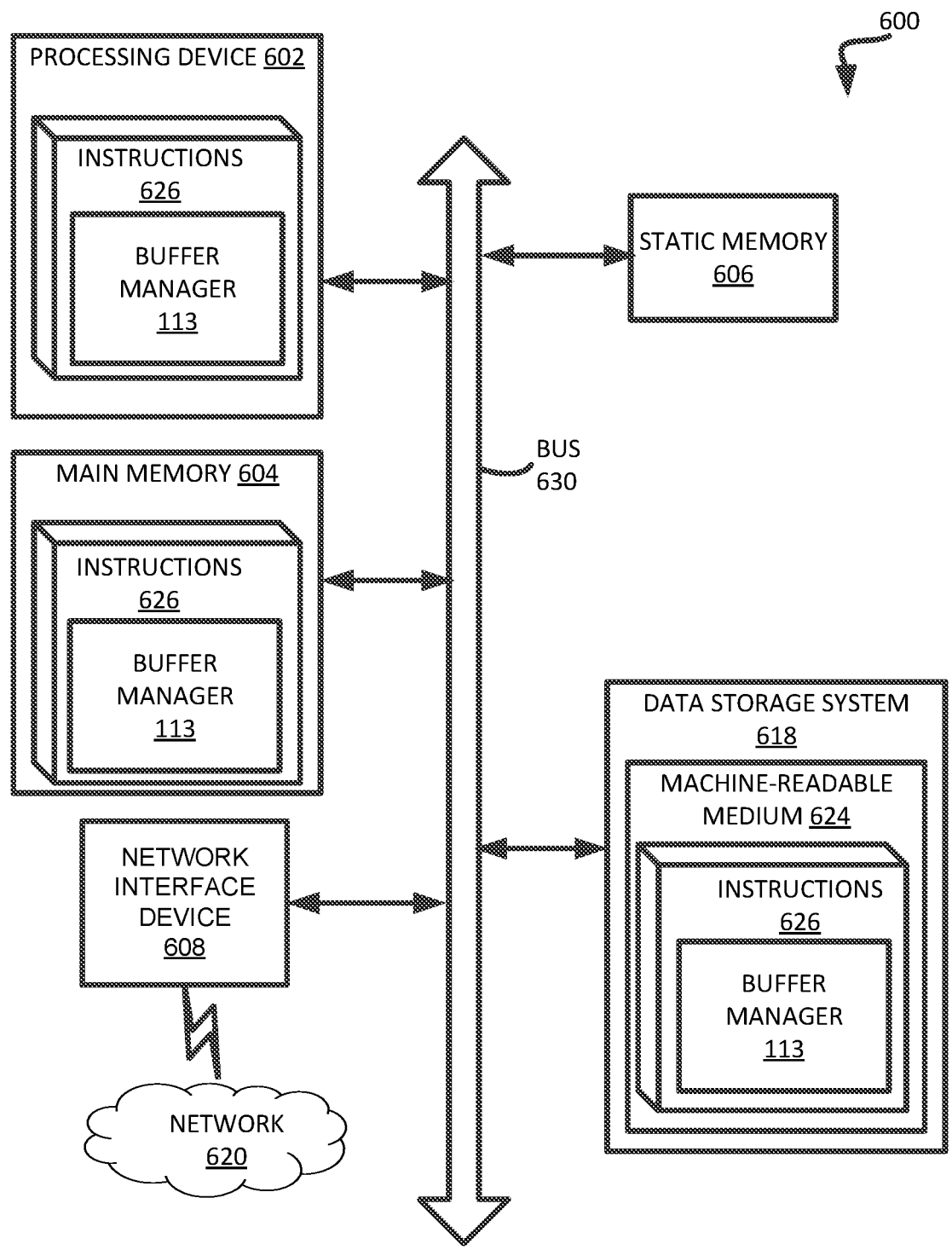
FIG. 6 is a block diagram of an example computer system in which embodiments of the present disclosure can operate.

FIG. 4 is a flow chart of a method 400 for sequential read optimization according to an embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the controller 115 (e.g., the command generation processor 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 4, at operation 410, the processing logic receives a read request that includes a first logical block address (LBA) of an LBA address space for a memory device. At operation 415, the processing logic creates a first logical transfer unit (LTU) to include the first LBA, the first LTU to be mapped to a first physical address of a memory device. The first LTU need not be sent to the translation processor 123 as long as the translation processor 123 has already created an LTU-to-PA entry in the LTU-to-PA mappings 301 of the shared volatile memory 140B (FIG. 3). The processing logic can then access the first physical address indexed against the first LTU within the shared memory 140B (FIG. 3).

With continued reference to FIG. 4, at operation 420, the processing logic determines whether a fast lookup flag is set. This fast lookup flag can be the flag 303, associated with the first physical address, set in the shared volatile memory 140B; or, the fast lookup flag can be a bit value in one of the registers 112 storing a bit map associated with ZNS-related physical address space of the memory device 130 or 140. In either case, the fast lookup flag can indicate that the first LTU is associated with a zone of multiple sequential LBAs that are sequentially mapped to multiple sequential physical addresses. At operation 440, the processing logic determines whether the die available flag 305 is set, which was discussed with reference to FIG. 3.

At operation 430, if either the fast lookup flag or the die available flag is not set, the processing logic submits the read request via a normal read path that includes sending the first LTU to the translation processor 123 for the translation processor 123 to do lookups, within the ZNS data structures, to map the first LTU to the first physical address.

At operation 450, assuming that the fast lookup flag and the die available flag is set with relation to the first LTU, the processing logic retrieves, from the volatile memory (e.g., the shared volatile memory 140B in FIG. 3), the first physical address that was stored (or buffered) there by the translation processor 123. The first physical address can be indexed within an entry of the LTU-to-PA mappings 301 of the shared volatile memory 140B.

At operation 460, the processing logic allocates a set of buffers in the volatile memory, where a capacity of the set of buffers matches an amount of the data stored at the first physical address and at subsequent physical addresses that are sequentially numbered within a read window size that starts at the first physical address. The volatile memory that stores the buffers can be the local memory 119, the volatile memory device 140A, and/or the shared volatile memory 140B. In various embodiments, the processing logic determines each subsequent physical address by incrementing the first physical address by page number until reaching an end of the read window size (e.g., the offset value).

At operation 470, the processing logic generates a set of command tags that are to direct the command execution processor 124 of the processing device to retrieve the data from the memory device and store the data in the set of buffers. The set of command tags can include a first command tag associated with the first physical address and additional command tags associated with the subsequent physical addresses.

At operation 480, the processing logic transmits, to the command execution processor 124, a group of commands respectively including the set of command tags. In one embodiment, the command generation processor 122 can interlink the set of command tags into a command chain (e.g., a chain of respective commands) and transmit the command chain in a single command message to the command execution processor 124.

FIG. 5 is a flow chart of a method 500 for sequential read optimization according to a related embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the controller 115 (e.g., the command generation processor 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 5, at operation 510, the processing logic receives a read request that includes a first logical block address (LBA) of an LBA address space for a memory device. At operation 520, the processing logic creates a first logical transfer unit (LTU) that includes the first LBA and is to be mapped to a first physical address of the memory device.

At operation 530, the processing logic reads a flag to determine that the first LTU is associated with a zone of LBA address space, wherein the zone includes multiple sequential LBAs that are sequentially mapped to multiple sequential physical addresses. As discussed, the flag can be the flag 303 stored in the shared volatile memory 140B or the bit value of the bit map stored in the registers 112. In either case, the flag or bit value can indicate that the LTU is associated with a zone that is mapped to data that is sequentially written in the memory device.

At operation 540, the processing logic allocates a set of buffers in the volatile memory, where a capacity of the set of buffers matches an amount of the data stored at the first physical address and at subsequent physical addresses that are sequentially numbered within a read window size that starts at the first physical address. The volatile memory that stores the buffers can be the local memory 119, the volatile memory device 140A, or other shared volatile memory 140B. In various embodiments, the processing logic determines each subsequent physical address by incrementing the first physical address by page number until reaching an end of the read window size.

At operation 550, the processing logic generates a set of command tags that are to direct a command execution processor of the processing device to retrieve the data from the memory device and store the data in the set of buffers. In this embodiment, the set of command tags includes at least a first command tag associated with the first physical address and a second command tag associated with a second physical address, of the subsequent physical addresses, that sequentially follows the first physical address.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIGS. 1A-1B.

In one embodiment, the instructions 726 include instructions to implement functionality corresponding to the buffer manager 113 of FIG. 1B. While the machine-readable storage medium 724 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device;
a volatile memory comprising buffers; and
a processing device coupled to the memory device and the volatile memory, wherein a command generation processor of the processing device is to:
receive, from a host system, a read request comprising a first logical block address (LBA) of an LBA address space for the memory device;
create a first logical transfer unit (LTU) to include the first LBA, the first LTU to be mapped to a first physical address of the memory device;
read, from the volatile memory, a flag to determine that the first LTU is associated with a zone of the LBA address space, wherein the zone comprises a plurality of sequential LBAs that are sequentially mapped to a plurality of sequential physical addresses; and
generate a set of command tags that are to direct a command execution processor of the processing device to retrieve data from the memory device and store the data in a set of the buffers, wherein the set of command tags comprises a first command tag associated with the first physical address and a second command tag associated with a second physical address that sequentially follows the first physical address.

2. The system of claim 1, wherein each command tag of the set of command tags comprises:
   an LTU number identifying an LTU that is mapped to a physical address of a physical address space of the memory device; and
   a buffer address of a location within the set of the buffers.

3. The system of claim 1, wherein the set of command tags further comprises additional command tags associated with subsequent physical addresses that are sequentially numbered following the second physical address, and wherein each subsequent physical address is incremented by page number until reaching an end of a read window size from the first physical address.

4. The system of claim 1, wherein the command generation processor of the processing device is further to:
   retrieve, from the volatile memory, the first physical address; and
   return, to the host system, a first subset of the data retrieved from the first physical address and that is stored in a first buffer of the set of the buffers.

5. The system of claim 4, wherein, in response to a second read request, the command generation processor is to:
   determine that a second LBA of the second read request corresponds to the second physical address;
   retrieve a second subset of the data from a second buffer of the set of the buffers, the second buffer having a buffer address associated with the second command tag; and
   transmit the second subset of the data to the host system.

6. The system of claim 1, wherein a translation processor of the processing device is to set the flag in the volatile memory based on the data being sequentially written to the memory device.

7. The system of claim 1, wherein the command generation processor is further to transmit, to the command execution processor of the processing device, a group of commands respectively comprising one of the set of command tags, and in response to receipt of the set of command tags, the command execution processor is to retrieve the data from the memory device and store the data in the set of the buffers according to respective buffer addresses of the set of command tags.

8. The system of claim 1, wherein the command generation processor is further to:
   interlink the set of command tags into a command chain; and
   transmit the command chain in a single command message to the command execution processor.

9. The system of claim 1, wherein the command generation processor is further to allocate and track the buffers within the volatile memory using one of:
   a two-three tree algorithm in which the buffers are sorted by LTU number; or
   an N-way cache that employs a hash algorithm.

10. A method comprising:
    receiving, by a command generation processor of a processing device, a read request comprising a first logical block address (LBA) of an LBA address space for a memory device;
    creating, by the command generation processor, a first logical transfer unit (LTU) to include the first LBA, the first LTU to be mapped to a first physical address of the memory device;
    reading, by the command generation processor from a volatile memory, a bit value of a bit map to determine that the first LTU is associated with a zone of the LBA address space, wherein the zone comprises a plurality of sequential LBAs that are sequentially mapped to a plurality of sequential physical addresses;
    allocating, by the command generation processor, a set of buffers in the volatile memory, wherein a capacity of the set of buffers matches an amount of data stored at the first physical address and at subsequent physical addresses that are sequentially numbered within a read window size that starts at the first physical address; and
    generating, by the command generation processor, a set of command tags that are to direct a command execution processor of the processing device to retrieve the data from the memory device and store the data in the set of buffers, wherein the set of command tags comprise at least a first command tag associated with the first physical address and a second command tag associated with a second physical address, of the subsequent physical addresses, that sequentially follows the first physical address.

11. The method of claim 10, further comprising, by the command generation processor:
    retrieving, from the volatile memory, the first physical address;
    determining that a die available flag, associated with the first physical address, is set; and
    returning, to a requesting agent, a first subset of the data retrieved from the first physical address and that is cached in a first buffer of the set of buffers.

12. The method of claim 11, further comprising:
    receiving a second read request;
    determining that a second LBA of the second read request corresponds to the second physical address within the read window size from the first physical address;
    retrieving a second subset of the data from a second buffer of the set of buffers, the second buffer having a buffer address associated with the second command tag; and
    transmitting the second subset of the data to the requesting agent.

13. The method of claim 10, further comprising tracking usage of the set of buffers via use of one of a flag or a counter for each buffer, wherein the tracking enables use of the set of buffers by multiple host applications corresponding to multiple zones.

14. The method of claim 10, wherein the set of command tags further comprise additional command tags associated with the subsequent physical addresses, to include the second command tag, the method further comprising determining the subsequent physical addresses by incrementing the first physical address by page number until reaching an end of the read window size from the first physical address.

15. The method of claim 10, wherein generating the set of command tags further comprises updating, within a command buffer of the volatile memory:
    the first command tag with a first LTU number of the first LTU and a first buffer address of the set of buffers; and
    the second command tag with a second LTU number of second LTU, corresponding to a second LBA, and a second buffer address of the set of buffers.

16. The method of claim 10, further comprising, by a translation processor of the processing device:
    determining that the first LBA is associated with the zone; and setting the bit value, associated with the first physical address, in the volatile memory based on the data being sequentially written to the memory device.

17. The method of claim 10, wherein the set of command tags further comprise additional command tags associated with the subsequent physical addresses, to include the second command tag, the method further comprising:
   transmitting, by the command generation processor to the command execution processor, a group of commands respectively comprising the set of command tags;
   retrieving, by the command execution processor, the data from the first physical address and from the subsequent physical addresses of the memory device; and
   storing the data in the set of buffers according to respective buffer addresses of the set of command tags.

18. The method of claim 10, further comprising:
   interlinking the set of command tags into a command chain; and
   transmitting the command chain in a single command message to the command execution processor.

19. The method of claim 10, further comprising tracking allocation of the set of buffers within the volatile memory via one of:
   a two-three tree algorithm in which the set of buffers are sorted by LTU; or
   an N-way cache that employs a hash algorithm.

20. A non-transitory computer-readable medium storing instructions, which when executed by a command generation processor of a processing device of a sub-system memory controller, cause the processing device to perform a plurality of operations comprising:
   receiving a read request comprising a first logical block address (LBA) of an LBA address space for a memory device;
   creating, by the command generation processor, a first logical transfer unit (LTU) to include the first LBA, the first LTU to be mapped to a first physical address of the memory device;
   reading, from a volatile memory, a flag to determine that the first LTU is associated with a zone of the LBA address space, wherein the zone comprises a plurality of sequential LBAs that are sequentially mapped to a plurality of sequential physical addresses;
   allocating a set of buffers in the volatile memory, wherein a capacity of the set of buffers matches an amount of data stored at the first physical address and at subsequent physical addresses that are sequentially numbered within a read window size that starts at the first physical address; and
   generating a set of command tags that are to direct a command execution processor of the processing device to retrieve the data from the memory device and store the data in the set of buffers, wherein the set of command tags comprise at least a first command tag associated with the first physical address and a second command tag associated with a second physical address, of the subsequent physical addresses, that sequentially follows the first physical address.

* * * * *